United States Patent
Kalinin et al.

(10) Patent No.: US 9,885,622 B2
(45) Date of Patent: Feb. 6, 2018

(54) SAW SENSOR ARRANGEMENTS

(71) Applicant: Transense Technologies PLC, Bicester, Oxfordshire (GB)

(72) Inventors: Victor Alexandrovich Kalinin, Headington (GB); Raymond David Lohr, Long Crendon (GB); Arthur John Leigh, Banbury (GB); Alexander Thomas James Stopps, Oxford (GB)

(73) Assignee: Transense Technologies, PLC, Oxfordshire (GB)

( * ) Notice: Subject to any disclaimer, the term of this patent is extended or adjusted under 35 U.S.C. 154(b) by 112 days.

(21) Appl. No.: 14/646,186

(22) PCT Filed: Nov. 22, 2013

(86) PCT No.: PCT/GB2013/053095
§ 371 (c)(1),
(2) Date: May 20, 2015

(87) PCT Pub. No.: WO2014/080221
PCT Pub. Date: May 30, 2014

(65) Prior Publication Data
US 2015/0338295 A1 Nov. 26, 2015

(30) Foreign Application Priority Data
Nov. 22, 2012 (GB) .................................. 1221050.6

(51) Int. Cl.
*G01L 3/00* (2006.01)
*G01L 3/10* (2006.01)
*G01L 1/16* (2006.01)

(52) U.S. Cl.
CPC ................ *G01L 3/10* (2013.01); *G01L 1/165* (2013.01); *G01L 3/106* (2013.01); *Y10T 29/49828* (2015.01)

(58) Field of Classification Search
CPC . G01L 3/10; G01L 3/045; G01L 1/165; Y10T 29/49828; Y10T 29/49833
(Continued)

(56) References Cited

U.S. PATENT DOCUMENTS 3,252,192 A * 5/1966 Smith ....................... F16L 1/10
138/99
3,537,304 A * 11/1970 Brewer ..................... G01L 3/10
336/30
(Continued)

FOREIGN PATENT DOCUMENTS

EP 1856761 B1 6/2008
EP 1882169 B1 4/2009
(Continued)

OTHER PUBLICATIONS

European Patent Office, International Search Report and Written Opinion dated Jun. 6, 2014, pp. 1-6, from International Stage PCT Application No. PCT/GB2013/053095.
(Continued)

*Primary Examiner* — Lisa Caputo
*Assistant Examiner* — Roger Hernandez-Prewitt
(74) *Attorney, Agent, or Firm* — Keusey & Associates, P.C.

(57) ABSTRACT

A SAW sensor arrangement includes a transducer including a support for supporting a SAW device. The support includes a sensor location part located between two oppositely extending attachment parts. The SAW device is mountable to the sensor location part. The sensor arrangement 10 includes at least two spaced friction raisers. The sensor arrangement includes a clamp arrangement which applies a clamping force to clamp the sensor arrangement to an item. The sensor arrangement is arranged so that in use each of the
(Continued)

friction raisers is located between a different one of the attachment parts and the item.

19 Claims, 6 Drawing Sheets

(58) Field of Classification Search
USPC .................................................. 73/862.325
See application file for complete search history.

(56) References Cited

U.S. PATENT DOCUMENTS

| | | | |
|---|---|---|---|
| 4,281,537 A * | 8/1981 | Burbank, III | G01L 3/101 73/862.331 |
| 5,585,571 A | 12/1996 | Lonsdale et al. | |
| 5,585,572 A | 12/1996 | Kindler | |
| 7,065,459 B2 | 6/2006 | Kalinin et al. | |
| 7,089,794 B2 | 8/2006 | Kalinin et al. | |
| 7,202,589 B2 | 4/2007 | Kalinin et al. | |
| 7,515,021 B2 | 4/2009 | Kalinin et al. | |
| 2005/0268729 A1 | 12/2005 | Lohr et al. | |
| 2007/0028700 A1 | 2/2007 | Liu et al. | |
| 2008/0127750 A1 * | 6/2008 | Thanigachalam et al. | G01L 3/10 73/862.325 |

FOREIGN PATENT DOCUMENTS

| | | |
|---|---|---|
| GB | 2116330 B | 9/1985 |
| JP | S5960332 A1 | 4/1984 |
| WO | WO2004/027365 A1 | 4/2004 |

OTHER PUBLICATIONS

GB Intellectual Property Office, Search Report dated Sep. 12, 2013, pp. 1-2, from GB Patent Application No. GB1221050.6.

* cited by examiner

SAW SENSOR ARRANGEMENTS

The present invention relates to SAW sensor arrangements.

Conventionally, there are various types of non-contact torque sensors used to measure the torque of a rotating shaft. However many of these conventional sensors are not suitable for use on large shafts such as ship propeller shafts or wind turbine shafts. For example, one group employs magneto-elastic or magneto-strictive effects. They require the use of materials with special magnetic properties for the shafts or embedding these materials into the shaft. This is not suitable for large diameter or long shafts, especially for aftermarket installation.

A second group of torque sensors employs strain gauges and either requires active battery-powered RF transmitters installed on the rotating shaft or heavy and expensive rotating transformers for low-frequency signal transmission between the shaft and the stationary interrogation electronics.

Other types of torque sensors, such as those employing Hall Effect or optical sensors, require significant modification of the shaft that introduces enough compliance to achieve measurable twist angles of the shaft subject to torque. In most cases, this modification is unacceptable.

Non-contact torque sensors based on SAW sensing elements have been disclosed in U.S. Pat. No. 5,585,571. A diagram illustrating the structure of such a conventional SAW torque sensor arrangement 50 (not according to the invention) is shown in FIG. 1, for measuring the torque of an item 54 in the form of a shaft. The sensor arrangement 50 includes an SAW device 56 in the form of a sensing die. This arrangement requires firm bonding of the SAW sensing die 56 to a flat spot (not shown) machined on the shaft surface. The die 56 is made of a thin piezoelectric quartz substrate with an aluminium pattern formed on its top surface, and its typical area is 4×6 mm. The pattern on the die 56 forms two to three SAW resonators 58 oriented at different angles to the shaft axis, for instance, at +45° and −45°. The structure of the die 56 has been disclosed in patents U.S. Pat. No. 7,202,589 and EP/GB 1882169. The resonators work at UHF range so they can be easily excited wirelessly by a relatively simple and small antenna of an interrogation unit (reader) 52 disclosed in U.S. Pat. Nos. 7,064,459 and 7,089,794. Without need of a battery installed on the shaft 54, the SAW resonators 58 can generate a signal (free oscillations) in response to the interrogation signal. The frequency of the SAW response depends on the strain on the quartz surface. When the shaft 54 is under torque, a shear strain proportional to the torque is created on the shaft surface. Then one of the SAW resonators 58 will be in tension while the other one will be in compression, so that their resonant frequencies will change linearly with torque in the opposite directions. The electronic interrogation unit 52 measures their resonant frequencies in a non-contact way via the sensor and reader antennas or via the RF rotary coupler (disclosed in the patents U.S. Pat. No. 7,515,021 and EP/GB 1856761). Then it calculates the difference between the two frequencies and finds the torque according to the calibration model of the sensor.

The aim of the stiff bond between the flat spot of the shaft 54 and the SAW die 56 is to transfer the shear strain from the shaft surface to the quartz surface with a minimum of: loss, non-linearity, non-repeatability and hysteresis. In practice, the stiff bond is achieved by using an adhesive with a large shear elastic modulus (this minimizes the strain dilution in the bond) and as high a glass transition temperature as possible (this minimizes reduction of the torque sensitivity with temperature). Bearing in mind a mismatch of thermal expansion coefficients between steel and quartz, the curing temperature for the adhesive cannot be high. Preferably, it should be 150°-200° C. in order not to introduce too high values of a thermally induced strain after installation and curing of the bond. In this case, the curing time can be quite long, up to 20 hours, to reach the required stiffness of the bond line. Clearly, it is not practical to hold a large diameter shaft or a long shaft in an oven at 200° C. for 10-20 hours. It is especially problematic for aftermarket sensor installation on such objects as wind turbines or ships.

Investigation of alternative bonding methods such as use of UV curing adhesives and low-temperature soldering of gold- or silver-plated SAW dies to the plated flat spots of the shafts have shown unacceptably high hysteresis above 2% full range, especially at elevated temperature.

Another problem of installation of the SAW sensing elements is a need to machine a flat spot on the shaft that is often not possible for the aftermarket installation.

According to a first aspect of the present invention, there is provided an SAW sensor arrangement, the arrangement including a transducer, the transducer including a support for supporting an SAW device, the support including a sensor location part located between two oppositely extending attachment parts, the SAW device being mountable to the sensor location part, the sensor arrangement including at least two spaced friction raisers, the sensor arrangement including a clamp arrangement which applies a clamping force to clamp the sensor arrangement to an item, the sensor arrangement being arranged so that in use each of the friction raisers is located between a different one of the attachment parts and the item.

Possibly, the transducer includes the SAW device.

Possibly, the transducer includes a fixing for fixing the SAW device to the sensor location part of the support. The fixing may include a bond, which may be an adhesive bond, which may be heat cured.

Possibly, the clamp arrangement includes at least one strap which extends from the support, around the item and back to the support. Possibly, the clamp arrangement includes two straps. Possibly, each strap extends from one of the attachment parts, around the item and back to the one attachment part, each strap extending from a different one of the attachment parts.

Possibly, the transducer is located in use on a measurement surface of the item. Possibly, the measurement surface is curved.

Possibly, each attachment part includes a curved surface on which the respective strap is locatable. Possibly, the curved surfaces of the attachment parts substantially follow the curved surface of the item.

Possibly, each attachment part defines a passage in which the respective strap is receivable. Each passage may be defined by the respective curved surface and a pair of spaced side walls.

Possibly, each attachment part includes a correspondence surface, which may substantially correspond in shape to the measurement surface. Each friction raiser may be located against or within the respective correspondence surface.

The sensor arrangement may be arranged so that in use each of the friction raisers is at least partially received in a corresponding interlock recess defined in the measurement surface of the item. Each interlock recess may be formed during assembly of the sensor arrangement to the item. The interlock recesses may be formed by the application of the clamping force, which may force at least part of the friction raisers into the measurement surface of the item to form the recesses.

Each friction raiser may be elongate, and may be in the form of an elongate member such as a wire. Each attachment part may define a recess in which the friction raiser is partially receivable. Alternatively, each friction raiser may be formed integrally with the respective attachment part.

Each friction raiser may comprise a projection, and more desirably comprises two or more spaced projections, which may project from the respective attachment part. The projections may be in the form of pins.

Each friction raiser may comprise one or more particles, which may be relatively hard, and may be embedded within an embedding layer, which may be formed of a relatively soft material.

The friction raisers may have a hardness which is greater than the hardness of the measurement surface. The friction raisers may have a hardness which is greater than the hardness of the correspondence surface.

Possibly, the sensor location part is substantially planar. Possibly, the plane of the sensor location part extends along and parallel to a longitudinal axis of the item. Alternatively, the plane of the sensor location part extends radially from a longitudinal axis of the item. The plane of the sensor location part may extend normally to the measurement surface.

Possibly, the sensor location part has an axis of symmetry, and the attachment parts may extend oppositely outwardly from the sensor location part along the sensor location part axis.

Possibly, in an installed condition, the sensor location part axis is orientated substantially parallel to the item axis.

The transducer may be relatively small in comparison with the item.

The sensor arrangement may include a plurality of transducers, which may be mounted by the same clamp arrangement to the same item. The transducers may be substantially equispaced around the item.

The sensor arrangement may include the item. The item may be a rotating member, and may be a shaft, and may be circular in cross section. The sensor arrangement may be for the measurement of torque. Possibly, the measurement surface does not include a machined flat.

According to a second aspect of the present invention, there is provided a method of mounting an SAW device to an item, the method including providing an SAW sensor arrangement, the arrangement including a transducer, the transducer including a support for supporting an SAW device, the support including a sensor location part located between two oppositely extending attachment parts, the SAW device being mountable to the sensor location part, the sensor arrangement including at least two spaced friction raisers, the sensor arrangement including a clamp arrangement which applies a clamping force to clamp the sensor arrangement to an item, the sensor arrangement being arranged so that in use each of the friction raisers is located between a different one of the attachment parts and the item.

Possibly, the sensor arrangement includes any of the features described above.

Possibly, the method includes any of the steps described above.

Embodiments of the present invention will now be described, by way of example only, and with reference to the accompanying drawings, in which:—

Figure 3A:
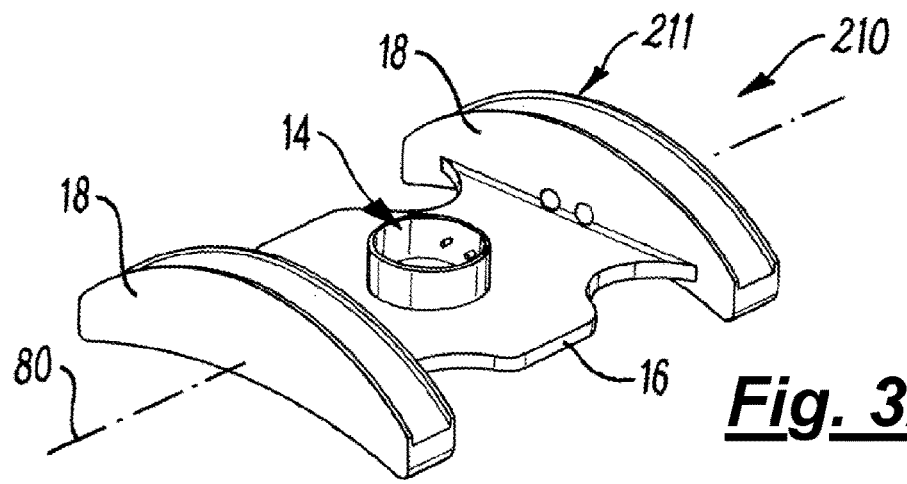
Figure 3B:
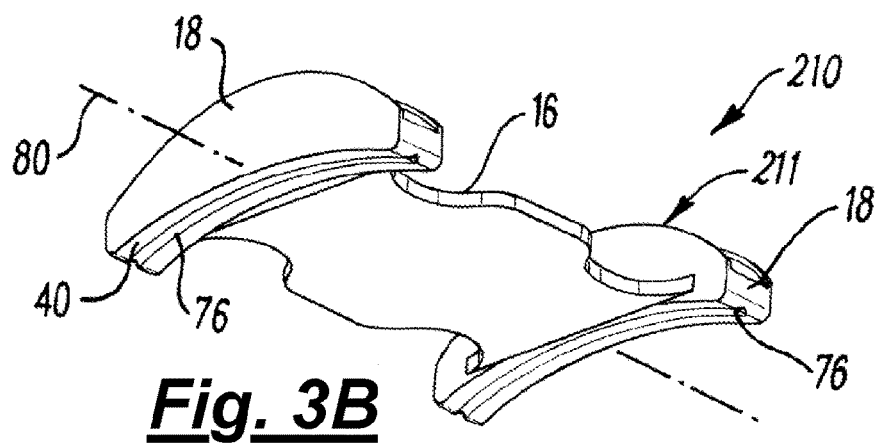
Figure 3C:
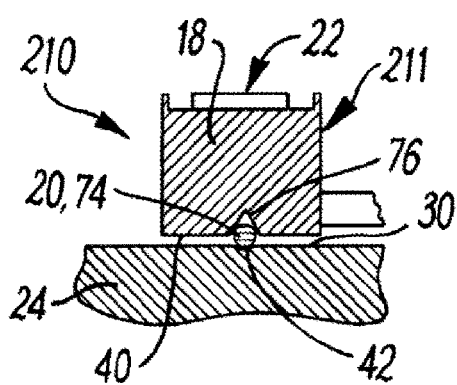
Figure 3D:
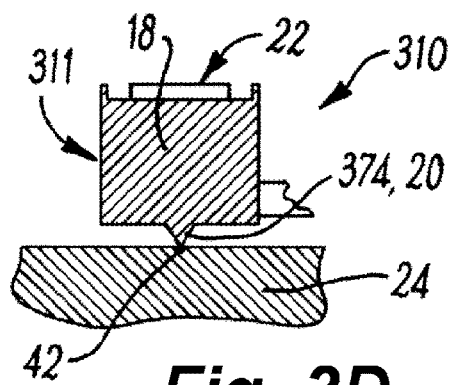
Figure 4:
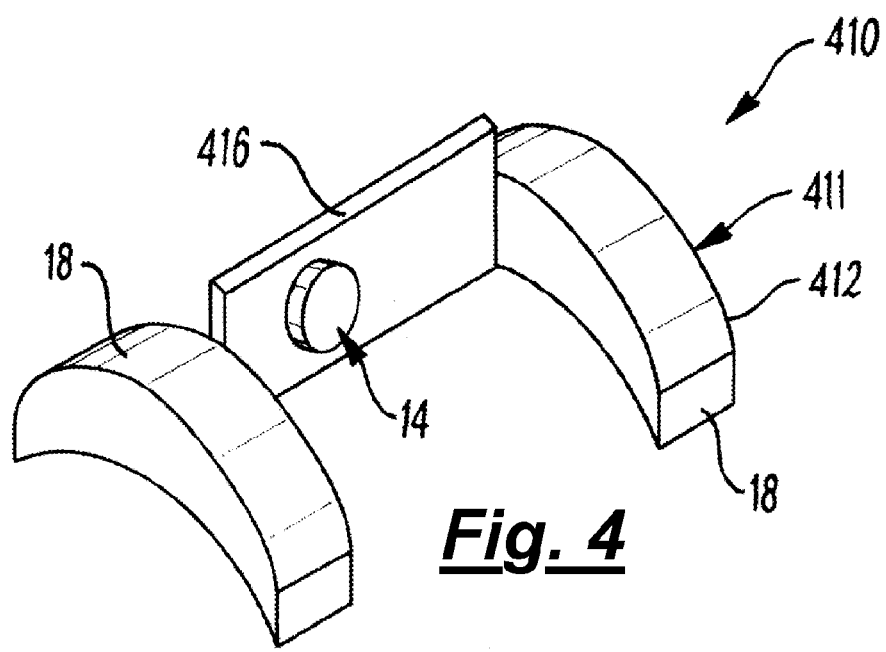
Figure 5:
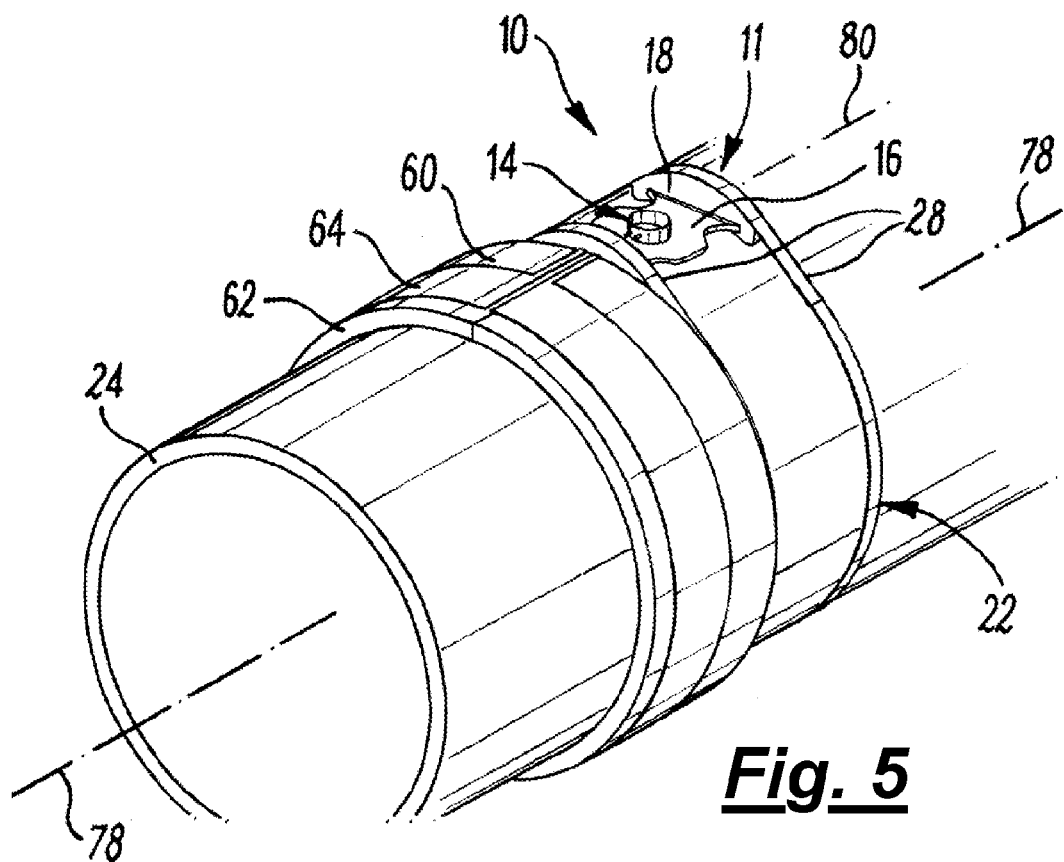
Figure 6:
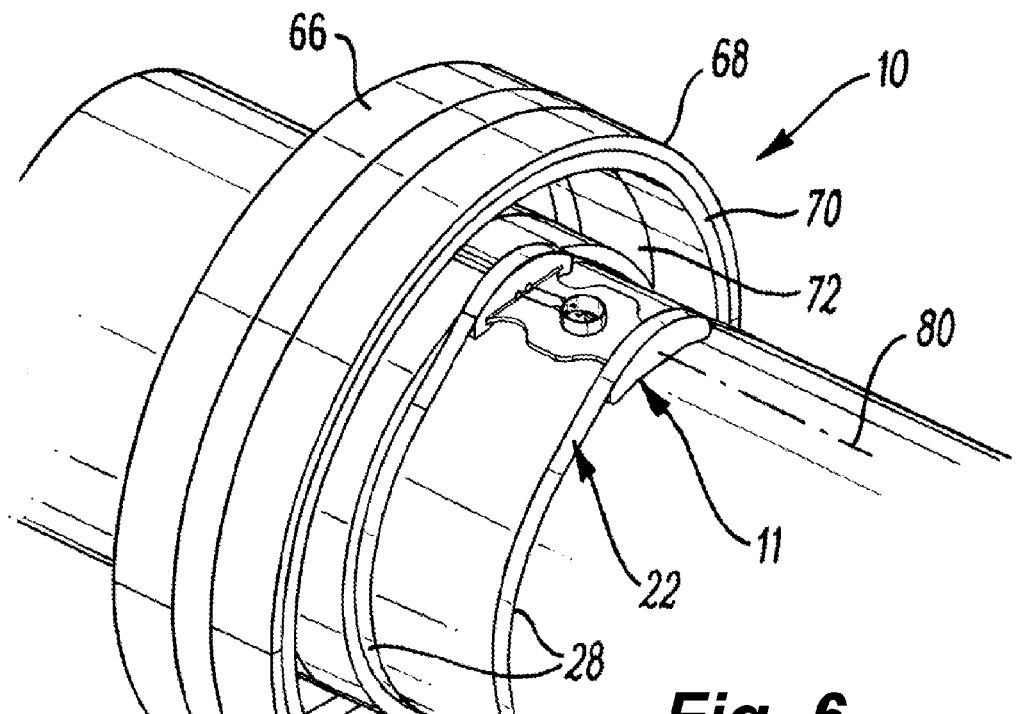
Figure 7:
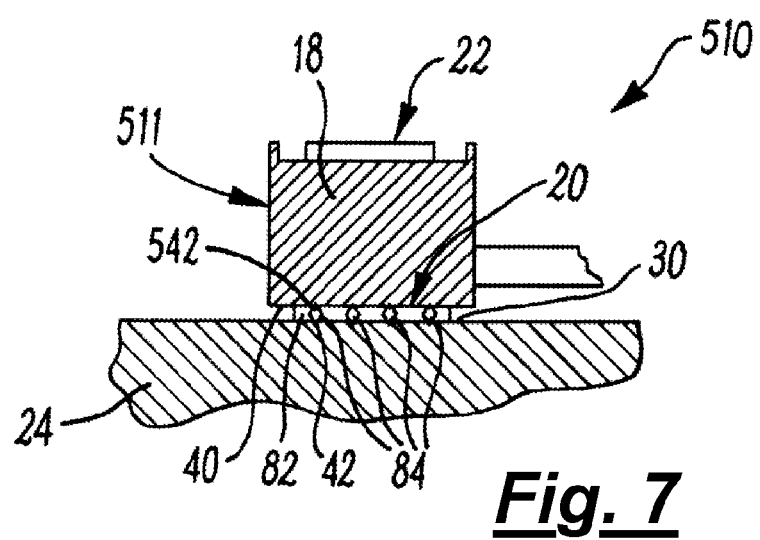
Figure 8:
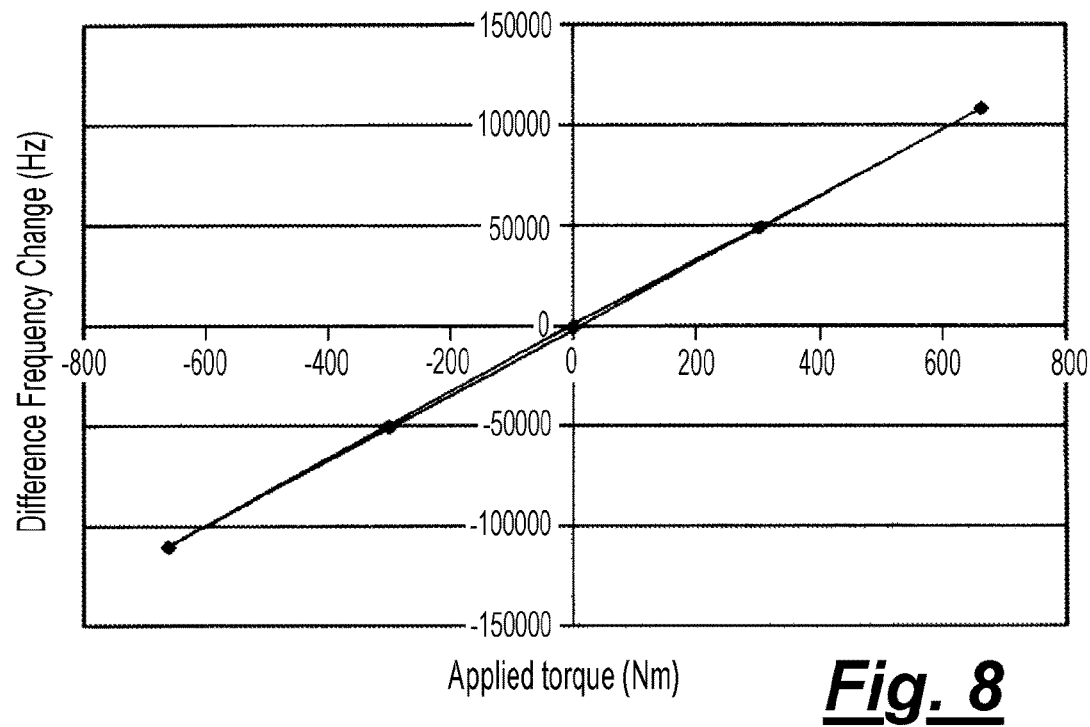
Figure 9:
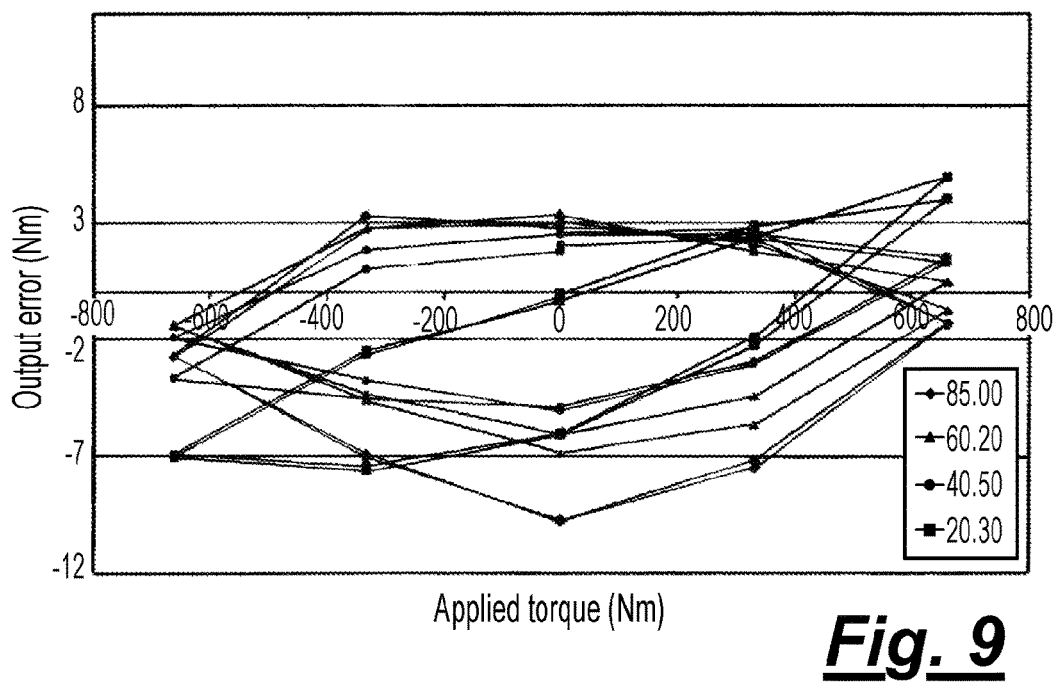

FIGS. 3A and 3B are perspective views of a transducer of a second sensor arrangement according to the invention; FIG. 3C is a side cross sectional view of part of the second sensor arrangement in use; FIG. 3D is a side cross sectional view of a third sensor arrangement according to the invention in use;

FIG. 4 is a perspective view of a transducer of a fourth sensor arrangement according to the invention;

FIG. 5 is a perspective view of the first sensor arrangement with a rotor couple installed;

FIG. 6 is a perspective view of the first sensor arrangement with the rotor couple and a stator couple installed;

FIG. 7 is a side cross sectional view of a fifth sensor arrangement according to the invention in use;

FIG. 8 is a graph showing the averaged difference between two resonant frequencies with applied torque of a torque sensor arrangement of the invention comprising two transducers; and FIG. 9 is a graph showing torque measurement error (output error) for a range of applied torques at different temperatures achieved after calibration.

FIGS. 2 to 6 show a number of embodiments of the invention, many features of which are similar. Therefore, for the sake of brevity, the embodiments will only be described in so far as they differ from each other. Where features are the same or similar, the same reference numerals have been used and the features will not be described again.

Figure 1:
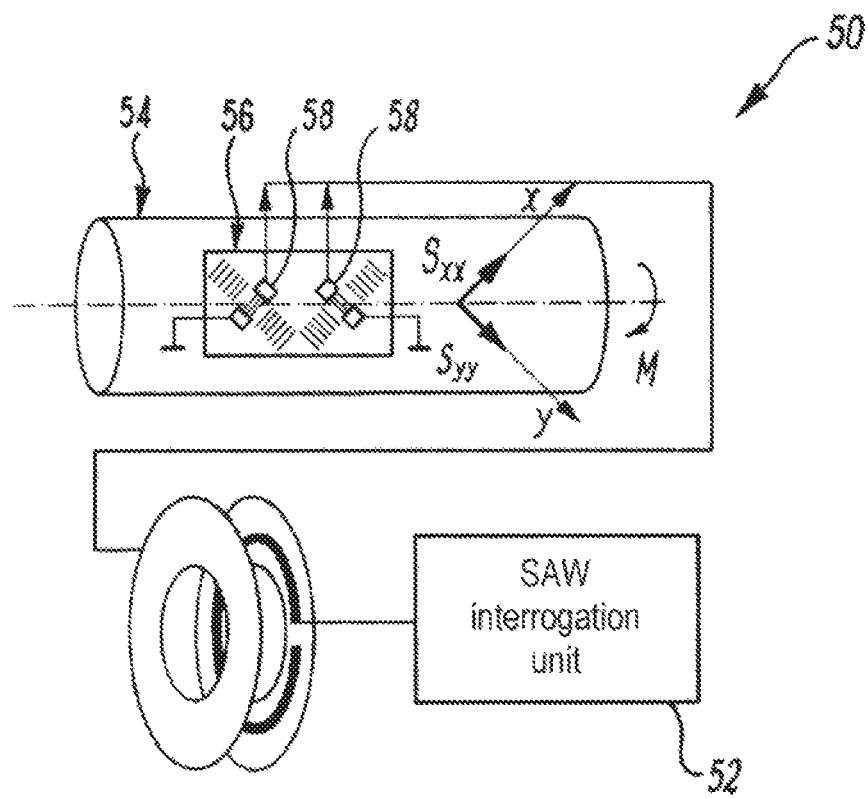
FIG. 1 is a schematic view of a conventional sensor arrangement not according to the invention.
Figure 2A:
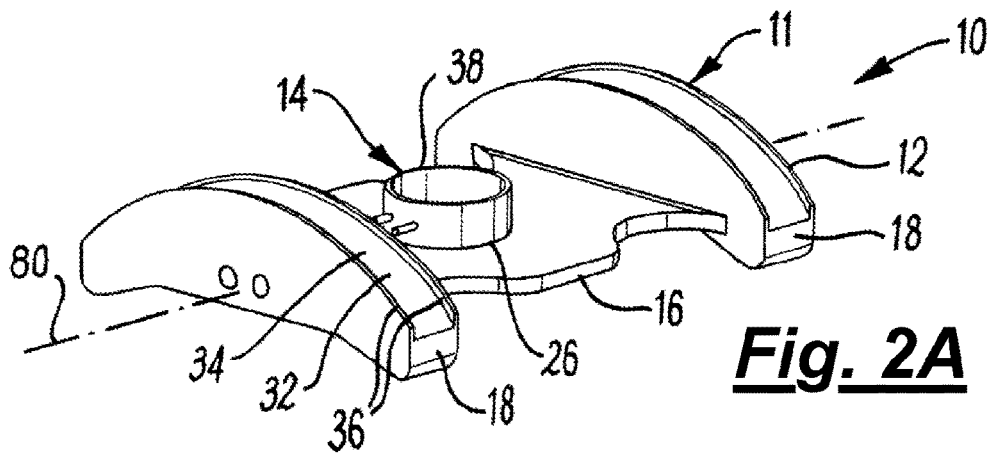
FIGS. 2A and 2B are perspective views of a transducer of a first sensor arrangement according to the invention.
Figure 2B:
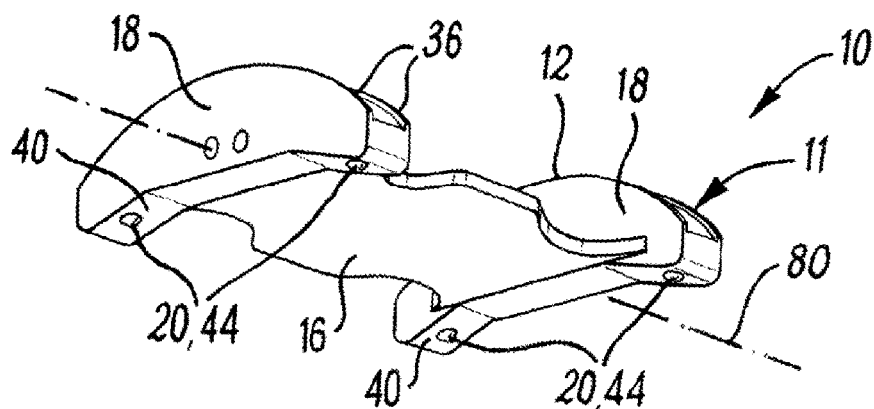
Figure 2C:
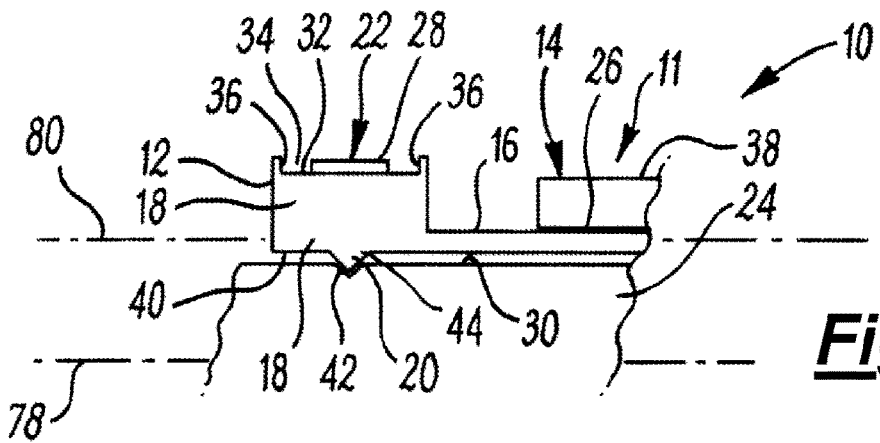
FIG. 2C is a side cross sectional view of part of the first sensor arrangement in use.

FIGS. 2A to 2C show an SAW sensor arrangement 10, the sensor arrangement 10 including a transducer 11, the transducer 11 including a support 12 for supporting a SAW device 14. The support 12 includes a sensor location part 16 located between two oppositely extending attachment parts 18. The transducer 11 includes the SAW device 14 which is mounted to the sensor location part 16. The sensor arrangement 10 includes two spaced friction raisers 20.

The transducer 11 includes a fixing 26 for fixing the SAW device 14 to the sensor location part 16 of the support 12. In one example, the fixing 26 comprises a heat cured adhesive bond.

The sensor location part 16 is substantially planar. In the example shown, the sensor location part 16 is in the form of a relatively thin plate.

The transducer 11 has an axis 80, which is an axis of symmetry for the sensor location part plate 16. The attachment parts 18 extend oppositely outwardly from the sensor location part 16 along the axis 80.

The SAW device 14 includes an SAW element (not shown), which in this example is packaged into a container 38. The SAW element could be bonded directly to the sensor location part 16.

Each attachment part 18 is in the form of a relatively thick shoulder, and defines a passage 34. More specifically, each passage 34 is defined by a curved surface 32 and a pair of spaced side walls 36.

Each attachment part 18 includes a correspondence surface 40, which forms an opposite side of the attachment part to the passage curved surface 32. The correspondence surfaces 40 are curved.

In this embodiment, each friction raiser 20 comprises a pair of spaced projections 44 in the form of substantially conically shaped pins, which project from the respective correspondence surfaces 40 of the attachment parts 18. In this embodiment, the projections 44 are formed integrally with the support 12.

In this embodiment, the item 24 is a rotating member, and could be a shaft, of substantially circular cross section which is relatively large in comparison with the support 12. The surface of the item 24 is curved. The sensor arrangement 10 is for the measurement of the torque of the item 24.

The item 24 could be mounted for rotation, and could be elongate. The item 24 could have a longitudinal and/or rotational axis 78.

In use, the SAW sensor arrangement 10 is employed as follows.

The SAW sensor arrangement 10 is arranged so that the attachment part curved correspondence surfaces 40 substantially correspond in shape to a measurement surface 30 of the item 24, which is the surface on which the sensor arrangement 10 is to be located.

The transducer 11 is located on the measurement surface 30 with the transducer axis 80 substantially parallel with the item axis 78. The friction raisers 20 are located between the correspondence surfaces 40 and the measurement surface 30.

The sensor arrangement 10 includes a clamp arrangement 22 which applies a clamping force to clamp the sensor arrangement 10 to the item 24.

Referring additionally to FIGS. 5 and 6, the clamp arrangement 22 includes two straps 28. In an installed condition, each strap 28 locates in the respective passage 34 against the passage curved surface 32 and extends around the item 24 and back to the respective attachment part 18. The passage curved surface 32 follows the curved measurement surface 30 of the item 24.

The friction raisers 20 have a hardness which is greater than the hardness of the measurement surface 30. In the installed condition, each friction raiser 20 is orientated substantially along a normal to the measurement surface 30. The clamping force is applied so that the projections 44 are forced at least partially into the measurement surface 30, each projection 44 forming an interlock recess 42 defined in the measurement surface 30, as shown in FIG. 2C.

In the installed condition, the correspondence surfaces 40 extend substantially partially circumferentially around the item axis 78. In the correct installed condition, the transducer axis 80 is parallel to the item axis 78 and a nominal shortest line between the transducer axis 80 and the item axis 78 is substantially perpendicular to the plane of the sensor location part plate 16.

To at least some extent, the transducer 11 is self-aligning to a correct position (ie the installed condition described above) by virtue of the corresponding curvature of the measurement surface 30 and the two spaced correspondence surfaces 40, and the tensioning action of the clamp arrangement 22. As the correspondence surfaces 40 are tightened against the measurement surface 30, the transducer 11 is automatically correctly positioned on the item 24, with the transducer axis 80 parallel to the item axis 78.

The sensor arrangement 10 could include any suitable means of communicating signals between the SAW device 14 and an interrogation unit. One such means is shown in FIGS. 5 and 6.

As shown in FIGS. 5 and 6, the sensor arrangement 10 includes an RF rotor couple 60, which is installed on the item 24. The RF rotor couple 60 forms the sensor antenna and comprises a dielectric substrate 62 and a micro-strip 64 which is electrically connected to the SAW device 14. As shown in FIG. 6, the sensor arrangement 10 also includes a stator couple 66 which forms the reader antenna, and comprises a holder 68, a dielectric substrate 70 and a micro-strip 72 electrically connected to the reader RF input. In one example, both the stator couple 66 and the rotor couple 60 could comprise two halves for easy assembly and disassembly to the item 24.

In one example, each clamping arrangement 22 could comprise a high-tension constant tension metal clamp (for instance, Heavy Duty TRIMAX® TRIDON® 843 Series Clamps). The curvature of the curved passage surface 32 means that the pressure applied by the clamps is more evenly distributed over the passage surface 32 and is therefore evenly applied to the friction raisers 20.

The thickness and the shape of the sensor location part plate 16 are optimized to obtain the strain generated by the torque on the plate surface for operation of the SAW torque sensing element (for instance, from 50 to 400 microstrain along the principal axes at the maximum measurable torque). The applicant has found that it is important that the transducer 11 is carefully formed so that the sensor location part plate 16 includes no localised stress raising features which could raise the localised stress of the material of the sensor location part plate 16 to a level approaching the yield point of the material when under load in use. The applicant has found that this can be achieved by the sensor location part plate 16 being substantially planar, and the SAW device being fixed to the sensor location part plate 16 by heat cured bonding as described above, which minimises local stresses. In one example, the material used for the sensor location part plate 16 could be stainless steel. In practice, the sensor location part plate 16 is designed to withstand stresses up to the yield stress divided by a design safety factor.

The correspondence surfaces 40 have a form which substantially matches the curvature of the measurement surface 30 shaft. The applicant has found that, without the friction raisers 20, if the clamping force provides a friction force between each of the attachment parts 18 and the item 24 which exceeds the shear force generated by torque, the sensor arrangement 10 would have a linear characteristic without hysteresis. Unfortunately, since the attachment part 18 is quite a stiff component, when the item 24 is subjected to torque, the friction force is not sufficiently strong to prevent stick-slip behaviour of the attachment part 18 on the item 24. This leads to an unacceptably high hysteresis of the sensor arrangement 10.

The friction raisers 20 minimize the contact area in an axial direction between the attachment parts 18 and the item 24, and the formation of the interlock recesses 42 provides a positive mechanical interlock between the transducer 11 and the item 24 which substantially prevents stick-slip behaviour when the item 24 is subjected to torque, significantly reducing hysteresis and improving measurement accuracy.

As a result of the interlock between the transducer 11 and the item 24, the item 24 effectively comprises part of the sensor arrangement 10. However, no machining operations to the item 24 are necessary to provide the sensor arrangement 10. In particular, it is not necessary to machine a flat on the item 24.

The indentations of the interlock recesses 42 are insignificant in comparison with the relatively large size of the item 24, and do not affect any of the material properties or operating characteristics of the item 24.

The projections 44 could be formed integrally with the attachment parts 18, for example, by machining, or could be formed separately and fixed to the attachment parts 18, for instance, by means of press fitting. The axis of each projection 44 could be approximately normal to the measurement surface 30. After some mechanical exercising, the interlock recesses 42 become stable due to work hardening. The number of the projections 44 could be two or more per attachment part 18.

In alternative embodiments (not shown), the sensor arrangement 10 could include a plurality of transducers 11, which are mounted by the same clamp arrangement 22 to the same item 24, the transducers 11 being substantially equispaced around the item 24.

For example, in one embodiment, a sensor arrangement could include two transducers 11 which are clamped to the item 24 on opposing sides thereof (diametrically opposite in the case of a circular shaft). Averaging the signals from the two transducers 11 allows compensation of the influence of shaft bending on the torque output.

SAW torque sensors require individual calibration at points across the whole operational temperature range. The need of individual calibration arises from tolerances on the SAW die parameters and variation of the bond line properties from unit to unit. The ease of installation and de-installation of the torque plate transducers 11 of the present invention makes it possible to calibrate them separately from the shaft 24 where they are meant to be used. Before installing them on the working shaft, they can be installed on a much shorter calibration shaft that can be made more compliant than the actual working shaft if needed. The calibration shaft with the clamped plate transducers 11 can be installed inside an oven on a torque calibration rig where a known torque can be applied at a known temperature. After characterizing temperature properties of the torque plate transducers 11 in the course of calibration, they can be installed on the actual working shaft 24.

A typical characteristic of a torque sensor arrangement comprising two transducers 11 measured at room temperature is shown in FIG. 8. It demonstrates variation of the averaged difference between the two resonant frequencies with the applied torque. The amount of hysteresis is approximately 0.9% full range. The torque measurement error at different temperatures achieved after calibration is shown in FIG. 9. The peak error does not exceed 0.6% full range.

The advantage of the sensor arrangements of the present invention is that the transducers are much smaller components than the item to be measured. This simplifies bonding of the SAW devices because of the much smaller thermal mass and a possibility to cure many transducers simultaneously in one oven.

A further advantage is that the transducer 11 can be easily attached to a shaft by the clamp straps 28 and detached from it if needed.

FIGS. 3A to 3C show a second sensor arrangement 210 including a transducer 211. In this arrangement 210, each of the friction raisers 20 comprises an elongate member 74 such as a wire. As shown in FIG. 3C, the elongate member 74 could have a rounded cross section, which could be substantially circular or elliptical. In alternative embodiments the elongate member 74 could have a cross section of different shape, such as pointed cross section shape, for example, a square, a diamond or any other suitable polygonal shape.

Each correspondence surface 40 of each attachment part 18 defines an elongate recess 76 in which one of the friction raisers 20 is partially receivable. In the installed condition, each of the elongate recesses 76 extends substantially circumferentially relative to the item axis 78. In cross section, the recess 76 could be relatively narrow and V-shaped.

In use, the clamping force is applied so that the elongate members 74 are forced at least partially into the measurement surface 30, each elongate member forming an interlock recess 42 defined in the measurement surface 30, as shown in FIG. 3C.

The elongate members 74 have a hardness which is greater than the hardness of the measurement surface 30.

FIG. 3D shows a third sensor arrangement 310 including a transducer 311. The sensor arrangement 310 is similar to the second arrangement 210 except that each of the friction raisers 20 comprises an elongate member 374 which is formed integrally with and projects from the respective correspondence surface 40. In the installed condition, each of the elongate members 374 extends substantially circumferentially relative to the item axis 78, and radially inwardly towards the item axis 78. In cross section, the elongate members 374 could be tapered to a point, and could be triangular. In other embodiments (not shown), the elongate members 374 could have a rounded cross section, and could, for example, be substantially part-circular or part-elliptical, or could have a different pointed cross section shape.

In other embodiments (not shown) the friction raisers 20 could be in the form of separate members which are attached to the correspondence surfaces by any suitable means eg adhesive bonding, welding.

FIG. 4 shows a fourth sensor arrangement 410 including a transducer 411 including a support 412 and an SAW device 14. In this embodiment, the planar sensor location part plate 416 is turned thorough 90°, so that in the installed condition the plane of the sensor location part plate 416 is orientated radially relative to the item axis 78 and normally to the measurement surface 30. This makes the transducer 411 more compliant and less critical to the amount of friction force in the contact area between the shoulder and the shaft. The SAW device 14 bonded to the sensor location part plate 416 should be sensitive to bending strain rather than shear strain. This can be achieved by rotating the SAW die (not shown) by 45° and shifting the SAW device 14 from a mid-point of the sensor location part plate 416 to a point on the sensor location part plate 416 at which the compression or tension strain is maximised.

FIG. 7 shows a fifth sensor arrangement 510 including a transducer 511. In this arrangement, each of the friction raisers 20 comprises one or more relatively hard particles 84 which are embedded in an embedding layer 82 of relatively soft material. In this example, the relatively hard particles 84 are arranged to have a hardness which is greater than the hardness of both the measurement surface 30 and the correspondence surface 40.

In use, the embedding layer 82 is applied over the measurement surface 30. The particles 84 could be applied along with the embedding layer 82, or could be applied separately to the embedding layer 82 after it has been applied. Prior to the fitting of the transducer 511, the embedding layer 82 holds the particles 84 against the measurement surface 30. The transducer 511 is then clamped into the installed condition, during which operation the embedding layer 82 reduces in thickness under the clamping force and the particles 84 are forced at least partially into the measurement surface 30 and the correspondence surface 40, each particle 84 forming an interlock recess 42 defined in the measurement surface 30 and an interlock recess 542 defined in the correspondence surface 40.

The particles 84 could be sharp edged particles or pointed particles, and could be abrasive particles, and could be a form of grit. The embedding layer 82 could be formed of an adhesive or bonding material.

In one example, the particles 84 are formed of aluminium oxide (Al$_2$O$_3$) and the embedding layer 82 is an adhesive. In this example, the applicant has found that the amount of hysteresis is comparable with that of the second embodiment.

The layer 82 with the particles 84 could be continuous over the measurement surface 30 and/or the correspondence surface 40, or could be located over only part of the measurement surface 30 and/or the correspondence surface 40. The layer 82 with the particles 84 could be located in discrete or discontinuous regions over the measurement surface 30 and/or the correspondence surface 40.

The layer 82 with the particles 84 could be utilised in conjunction with a friction raiser of one of the previous embodiments.

It will be realised that any of the transducers 211, 311, 411, 511 and associated components could be used instead of the transducer 11 in the arrangements shown in FIGS. 5 and 6 to form sensor arrangements 210, 310, 410, 510 respectively.

Various other modifications could be made without departing from the scope of the invention. The various components of the arrangements could be of any suitable size and shape, and could be formed of any suitable material. The SAW device could comprise any suitable number and type of SAW sensing elements.

The clamp arrangement 22 could be of any suitable design. For example, the clamp arrangement 22 could comprise any suitable number of straps 28.

Any of the features or steps of any of the embodiments shown or described could be combined in any suitable way, within the scope of the overall disclosure of this document.

There is thus provided an SAW sensor arrangement which enables the torque of a relative large item to be measured easily and accurately. The sensor arrangement of the invention permits the fixing and calibration of an SAW device to a support to form a transducer which can be easily handled and subsequently fitted to and removed from a large item such as a ship propeller shaft or a turbine shaft for the measurement of torque. No modification of the shaft is required. The sensor arrangement can be retro fitted to an existing shaft in situ. The sensor arrangements of the invention have been found to provide accurate torque measurement with relatively low hysteresis.

The invention claimed is:

1. A SAW sensor arrangement comprising:
    a transducer having a support including two oppositely extending attachment parts and a sensor location part disposed between said two oppositely extending attachment parts, wherein said sensor location part is adapted to have a SAW device mounted thereon;
    at least two spaced friction raisers; and
    a clamp which applies a clamping force adapted to clamp the sensor arrangement to an item with each of the friction raisers located between a different one of the attachment parts and the item, and wherein
    each friction raiser comprising one or more particles embedded within an embedding layer, wherein the one or more particles is formed of a material which is harder than said embedding layer, said attachment part and said item; wherein each particle forms in interlock recess in both said attachment part and said item.

2. The arrangement of claim 1, wherein said transducer includes said SAW device; and wherein the formation of two recesses by each particle on said attachment part and a reduced contact area of said item provides mechanical interlock to prevent stick-slip thereby reducing hysteresis so that measurement accuracy by said SAW device is improved.

3. The arrangement of claim 2, wherein said clamp includes at least one strap which extends from one of said support and said attachment part, around the item and back to said support.

4. The arrangement of claim 3, wherein said transducer is located in use on a shaped measurement surface of the item, wherein each attachment part includes a correspondence surface and a passage having side walls through which the respective strap is located and wherein said correspondence surface substantially follows the shaped measurement surface; and wherein said particles are selected from the group consisting of sharp-edged particles, pointed particles, abrasive particles, grit particles and combinations thereof.

5. The arrangement of claim 4, said straps directly contact said item across a surface area remote from said attachment surface, wherein the surface area between said straps and said item is devoid of friction raisers.

6. The arrangement of claim 5, wherein the recess is formed during assembly of the sensor arrangement to the item.

7. The arrangement of claim 5, wherein the recess is formed by application of the clamping force, which forces at least part of the friction raisers into the measurement surface of the item to form the recesses.

8. The arrangement of claim 1, wherein said transducer includes an adhesive bond for fixing the SAW device to said sensor location part of said support.

9. The arrangement of claim 1, wherein said particles are selected from the group consisting of sharp-edged particles, pointed particles, abrasive particles, grit particles and combinations thereof.

10. The arrangement of claim 1, wherein said sensor location part is substantially planar and extending one of: parallel to a longitudinal axis of the item, radially from a longitudinal axis of the item, and normally to the measurement surface.

11. The arrangement of claim 1, wherein the sensor location part has an axis of symmetry, and the attachment parts extend oppositely outwardly from the sensor location part along the sensor location part axis, wherein in an installed condition, the sensor location part axis is oriented substantially parallel to a longitudinal item axis.

12. The arrangement of claim 1, in which the transducer is relatively small in comparison to the item, wherein the sensor arrangement includes a plurality of transducers, wherein the plurality of transducers are mounted by the same clamp to the same item.

13. The arrangement of claim 1, wherein the item is one of a rotating member, a shaft, and an item having a circular cross-section.

14. The arrangement of claim 1, wherein the sensor arrangement is for measuring torque.

15. The arrangement of claim 1, wherein the measurement surface of the item does not include a machined flat.

16. A method of mounting an SAW device to an item, comprising the steps of:
    providing a SAW sensor arrangement including a transducer, the transducer including a support for supporting a SAW device, the support including a sensor location part located between two oppositely extending attachment parts, the sensor arrangement including at least two spaced friction raisers;
    mounting the SAW device to the sensor location part; and clamping the sensor arrangement with a clamp to an item, the sensor arrangement being arranged so that in use each of the friction raisers is located between a different one of the attachment parts and the item and wherein each friction raiser comprising one or more particles embedded within an embedding layer, wherein the one or more particles is formed of a material which is harder than said embedding layer, said attachment parts and said item; wherein each particle forms in interlock recess in both said attachment part and said item.

17. The method of claim 16, including a plurality of transducers and wherein said particles are selected from the group consisting of sharp-edged particles, pointed particles, abrasive particles, grit particles and combinations thereof.

18. The method of claim 16, wherein the item is one of a rotating member, a shaft, an item having a circular cross-section, and an item having a measurement surface that is devoid of a machined flat; and further including a strap extending from said attachment part around the item; wherein said strap directly contacts said item across a surface area remote from said attachment part, wherein the surface area between said strap and said item is devoid of friction raisers.

19. The method of claim 16, wherein the sensor arrangement is for measuring torque; and wherein the formation of two recesses by each particle on said attachment part and a reduced contact area of said item provides mechanical interlock to prevent stick-slip thereby reducing hysteresis so that measurement accuracy by said SAW device is improved.

* * * * *